United States Patent
Kuebrich et al.

(10) Patent No.: US 8,599,579 B2
(45) Date of Patent: Dec. 3, 2013

(54) METHOD OF CONTROLLING A PFC STAGE OPERATING IN BOUNDARY CONDUCTION MODE, A PFC STAGE, AND AN SMPS

(75) Inventors: Johann Baptist Daniel Kuebrich, Schlüsselfeld (DE); Thomas Antonius Duerbaum, Baiersdorf (DE); Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 356 days.

(21) Appl. No.: 12/957,121

(22) Filed: Nov. 30, 2010

(65) Prior Publication Data

US 2012/0008350 A1  Jan. 12, 2012

(30) Foreign Application Priority Data

Oct. 30, 2009  (EP) ..................................... 09177548

(51) Int. Cl.
- *H02M 3/335* (2006.01)
- *H02M 5/42* (2006.01)
- *H02M 7/04* (2006.01)
- *H02M 7/68* (2006.01)

(52) U.S. Cl.
USPC ........................................ 363/21.12; 363/89

(58) Field of Classification Search
USPC ............ 323/222–224, 259; 363/21.12–21.18, 363/89
See application file for complete search history.

(56) References Cited

U.S. PATENT DOCUMENTS

| | | | |
|---|---|---|---|
| 5,430,364 A  * | 7/1995 | Gibson | ........................... 363/89 |
| 6,341,073 B1 * | 1/2002 | Lee | ............................ 363/21.02 |
| 6,421,256 B1 | 7/2002 | Giannopoulos et al. | |
| 2005/0073862 A1 | 4/2005 | Mednik et al. | |
| 2009/0086513 A1 * | 4/2009 | Lombardo et al. | .......... 363/21.12 |

FOREIGN PATENT DOCUMENTS

GB   2 426 836 A   12/2006

OTHER PUBLICATIONS

Schildbach C., et al. : "Averaged Large Signal Model of Boost Power Factor Corrector in Boundary Conduction Mode," Power Electronics and Applications, IEEE Conf., pp. 1-9, (Sep. 8, 2009).
Langeslag W., et al. : "A High-Voltage Compatible BCD SoC-ASIC Performing Valley-Switching Control of AC-DC Power Converters Based on PFC and Flyback Cells," IEEE Industrial Electronics, pp. 2996-3001, (Nov. 1, 2006).
Extended European Search Report for Patent Appln. No. 09177548.6 (Apr. 23, 2010).

* cited by examiner

*Primary Examiner* — Jue Zhang

(57) ABSTRACT

Consistent with an example embodiment, there is a control method which reduces the steps: instead of a constant on-time for the switch, the duration of the on-time is increased each time an additional valley to be skipped. The predetermined increase may be either a fixed fractional increase or a further additional increment; it may be determined by a small regulation loop that multiplies the on-time from the main loop with a factor equal to the ratio between measured period time and the sum of primary and secondary stroke times.

8 Claims, 9 Drawing Sheets

METHOD OF CONTROLLING A PFC STAGE OPERATING IN BOUNDARY CONDUCTION MODE, A PFC STAGE, AND AN SMPS

This application claims the priority under 35 U.S.C. §119 of European patent application no. 09177548.6, filed on Nov. 30, 2009, the contents of which are incorporated by reference herein.

FIELD OF INVENTION

This invention relates to methods of controlling power factor correction (PFC) stages for switched mode power supplies (SMPS). In particular, it relates to controlling PFCs operating in boundary conduction mode (BCM) including valley skipping.

It also relates to controllers for PFC stages for SMPS, and to SMPS which comprise such controllers.

Without limitation, the invention is particularly applicable in fields such as adapters for information technology (notebooks, faxes, printers etc.) and the consumer market (adapters for DVD players, CD players etc.), in addition to the PC desktop and server market as well as electronic ballasts.

BACKGROUND

Control of the power factor of switched mode power supplies is becoming increasingly important, particularly for SMPS which are designed to be applicable directly from a mains input power. This is in part due to legislation such as European Union regulation EN 61000-3-2, and in part due to increasing emphasis on energy efficiency, such as required by the 80+ initiative.

In order to ensure that mains harmonic levels are adequately low, currently SMPS use either a passive filter or an active circuit to effect power factor correction. For low to medium power applications (that is, below a few kilowatts) power factor correction is achieved by using a boost converter, fly-back converter or Buck derived converter (for example a forward converter) with appropriate control of the active switch. There are two basic controller schema: the first uses fixed frequency in either discontinuous conduction mode or continuous conduction mode (DCM and CCM respectively), depending on the power level; the second uses boundary conduction mode (BCM) operation. Although there are no rigid boundaries between the two schema, many high-volume applications operating in the 100 W range such as notebook computers, DVD players, pre-conditioners in desktop PC supplies such as the Silverbox, and the like, use BCM operation.

One drawback of BCM operation is the high switching frequency which can occur under light loads. In order to prevent undesirably high switching frequencies, a method of operation which includes valley skipping in conjunction with BCM has been developed. This method is disclosed in U.S. Pat. No. 6,256,210B1, the entire contents of which are incorporated herein by reference. By modifying the BCM such that valleys are "skipped", at the end of the secondary stroke before the switch is closed to restart the primary stroke, an upper limit of switching frequency is achieved. Thus, instead of traditional boundary conduction mode, in which the switch is closed immediately on the inductor current returning to zero, valley skipping involves retarding the switch closure. When the current has returned to zero, a resonance of the voltage at the switching node starts through the inductor and parasitic capacitance, the parasitic capacitance being mainly in the switch. This results in a ringing around zero inductor current. In the valley skipping control, the switch is not closed until the inductor current is at a subsequent zero-crossing (which, for a valley at the switching node, is positive-going). Optionally, the number of valleys skipped can be counted, or alternative means used to determine at which zero-crossing the switch is to be closed. Introducing the ringing into the switching cycle increases the overall switching cycle period, and thus reduces the switching cycle frequency. As the power level is reduced further, corresponding to even lighter loads, the ringing time can be further increased, maintaining the same on-time for the switch. (Since the switch on-time determines the energy transferred per switching cycle, the latter remains constant; however, increasing the ringing period increases the switching cycle period such that there are fewer switching cycles per unit time, so the power transferred—which is the energy transferred per unit time—is decreased.)

By introducing valley skipping into BCM conduction, perturbations are introduced and the power factor is reduced: each time the frequency clamping increases the number of skipped valleys, a sharp step can be found in the averaged inductor current (which in the case of a boost converter is the line current). This is illustrated in FIG. 1, which shows inductor current 11 (averaged over the switching cycle) over a mains half-cycle. As the average current decreases, each time the frequency clamp forces the controller to skip an additional valley, there is a noticeable step 12, 12' in the average current.

FIG. 2 shows the waveform of the average current 21, in front of the necessary EMC filter, over the same mains half-cycle. Distortion 22, 22' of average current from of the desired sine wave is still clearly visible.

Thus there is a need for an improved method of operating a BCM controller such that the input current follows more closely a perfect sine wave, leading to an improved power factor which is closer to unity.

SUMMARY OF THE INVENTION

The present invention has been found useful in providing a method of controlling a PFC stage for a SMPS, for an improved power factor.

According to an aspect of the present invention there is provided a method of controlling a power factor correction stage for a switched mode power supply, the power factor correction stage having a switch which is periodically closed for an on-time and operating in boundary conduction mode with valley skipping, including the steps of determining a change in the number of valleys skipped in a switching cycle, and controlling the duration of the on-time of a subsequent switching cycle in dependence on the change in the number of valleys skipped.

In embodiments the power factor correction stage operates with a switching cycle having a duration Tper and a secondary stroke, which secondary stroke commences at the end of the on-time Ton and ends when an output current first reaches zero thereafter and has a duration Tsec, and a duration of the on-time of the subsequent switching cycle, Ton', is calculated from the duration of the on time (Ton) through:

$$Ton' = Ton * Tper/(Ton + Tsec).$$

This calculation of the adjustment to the on-time, provides a close approximation of the ideal correction required to account for the change in cycle time due to a skipping of a different number of valleys.

However, alternative calculations may be utilised, In particular, in other embodiments, the duration of the on-time is controlled so as to vary with the number of valley skipped as an arithmetic series. Thus, for each additional valley which is skipped, the on-time is increased by a fixed, predetermined, time period. Preferably, the arithmetic series is chosen to maximise a power factor of the power factor correction stage.

In still other embodiments, the duration of the on-time is controlled so as to vary with the number of valleys skipped as a geometric series. Thus, for each additional valley which is skipped, the on-time is increased by a fixed, predetermined fraction of a baseline on-time. Preferably, the geometric series is chosen to maximise a power factor of the power factor correction stage.

In embodiments the duration of the on-time is clamped so as not to exceed a predetermined limit. The allowed time for which the switch is closed may thus be limited to a practicable or realistic value, so as not to interfere with the overall BCM controller methodology.

In embodiments a look-up table is used to determine the duration of the on-time. Alternative implementations such as analog or digital circuitry are also within the scope of the invention.

Embodiments may include a low-pass filter step for preventing a change in duration of the on-time between consecutive switching cycles from exceeding a predetermined limit. Since the switching cycle is typically at least two or three orders of magnitude faster than that the mains cycle, a gradual change of the on-time over several switching cycles does not unduly limit the effectiveness of the method, whilst avoiding undesirable instabilities which could otherwise result from rapid changes.

According to another aspect of the invention there is provided a controller for a switched mode power supply, configured to operate a method as described above. According to a yet further aspect of the invention there is provided a switched mode power supply comprising a controller as described above.

Thus the inventors have appreciated, and the invention is based in part on the realisation, that distortion from the ideal sine wave results from a reduction of the transfer of power caused by the control method applied for BCM. The constant on-time control transfers power to the DC bus capacitor by applying peak currents in a way such that the input current resembles a sine wave. However, this is only true if the next switching cycle starts immediately after the inductor current reach zero. The dead time introduced by skipping valleys reduces the power transfer leading to distorted input currents. FIG. 3 illustrates the effect of skipping valleys on the voltage waveform, and shows the drain-source voltage 30 across the switch. Instead of the switch being turned on once the drain-source voltage returns to a first near-zero minimum as shown at minimum 31, due to valley-skipping, the switch may be turned on later than the drain-source voltage reaching this minimum, i.e. at a later minimum, as shown at minima 32 and 33, which correspond to skipping a single valley or 2 valleys respectively; this leads to a distortion in the sine wave, and deviation from the unity power factor.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1:
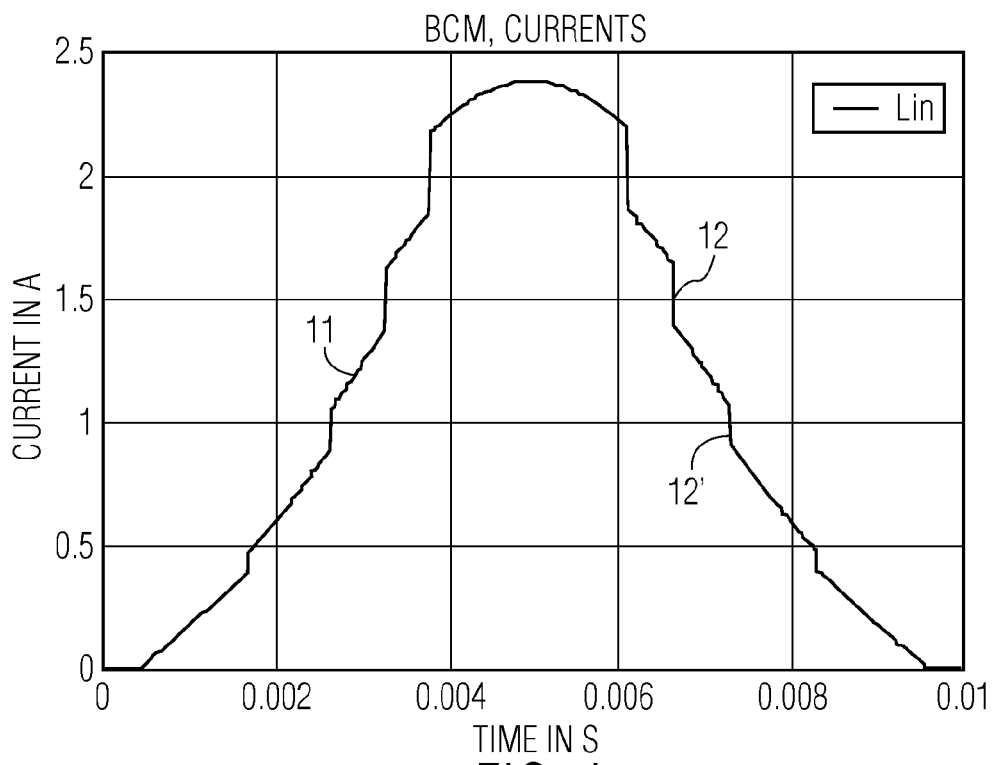
FIG. 1 shows average inductor current over a mains half-cycle, for a PFC stage operated in BCM with valley skipping.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION

Figure 4:
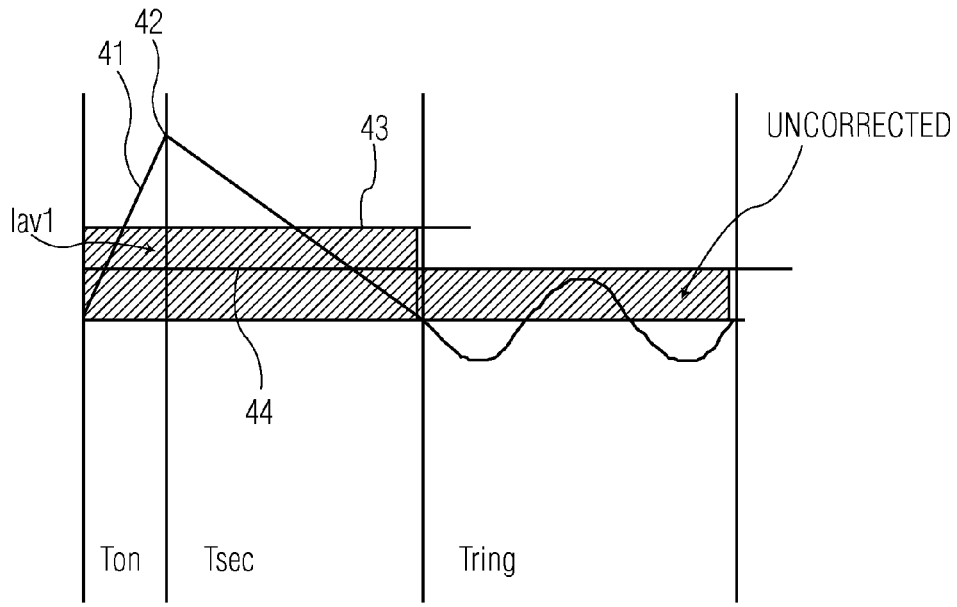
FIG. 4 shows the inductor current for a PFC stage operating in BCM with valley skipping.

FIG. 4 shows the inductor current during a switching cycle which incorporates skipping one valley of the drain voltage: the first positive-going zero crossing is skipped, such that the second positive-going zero crossing triggers operation of the switch. The switching cycle comprises three intervals, during of the first interval Ton, the inductor current increases linearly to a maximum 42. This interval corresponds to the primary stroke of the PFC. During the second interval, Tsec, the current decreases linearly, from the maximum 42, to zero. This interval is the secondary stroke of the PFC. Absent valley skipping, the switching cycle would now be complete and the switch is ready to be closed to start a further Ton period. Using valley switching, the switch is then switched on at the first positive going zero crossing of the inductor current, corresponding to the first valley of the drain voltage. (Thus, using valley-switching but absent valley-skipping, the complete cycle includes the intervals shown Ton+Tsec+the first negative part of Tring) However, in the presence of valley skipping, there is a third interval—the remainder of Tring—subsequent to the second interval Tsec and starting at the zero-crossing of the first positive going slope of the inductor current. During this third interval, the current continues to ring around resonance circuit of the PFC, resulting in 1 or more extra ringings of the drain voltage.

Also shown in the figure is the level or magnitude 43 of the average current during the first two of intervals (Ton and Tsec). It will be immediately apparent to the skilled person that the magnitude 43 of this average current is half of the peak current 42 achieved at the end of the Ton interval.

Finally, the figure also shows the level of magnitude 44 of the current averaged over the complete a switching period, due to the presence of the ringing interval Tring, during which the average current is less than zero.

Since the average current over the primary and secondary stroke (Ton+Tsec) is directly proportional to the momentary mains voltage, the load appears to the mains as a (nearly) purely resistive load, resulting in unity power factor, absent valley skipping. (In practice, there will be a small distortion, even in this case, since the demagnetisation detection at the end of the secondary stroke results in a quarter period Tring). However, the presence of the Tring interval due to valley skipping results in a longer overall switching period, as a result of which the current averaged over the complete switching period is no longer directly proportional to the momentary mains voltage. This results in a serious distortion of the mains current.

Figure 5:
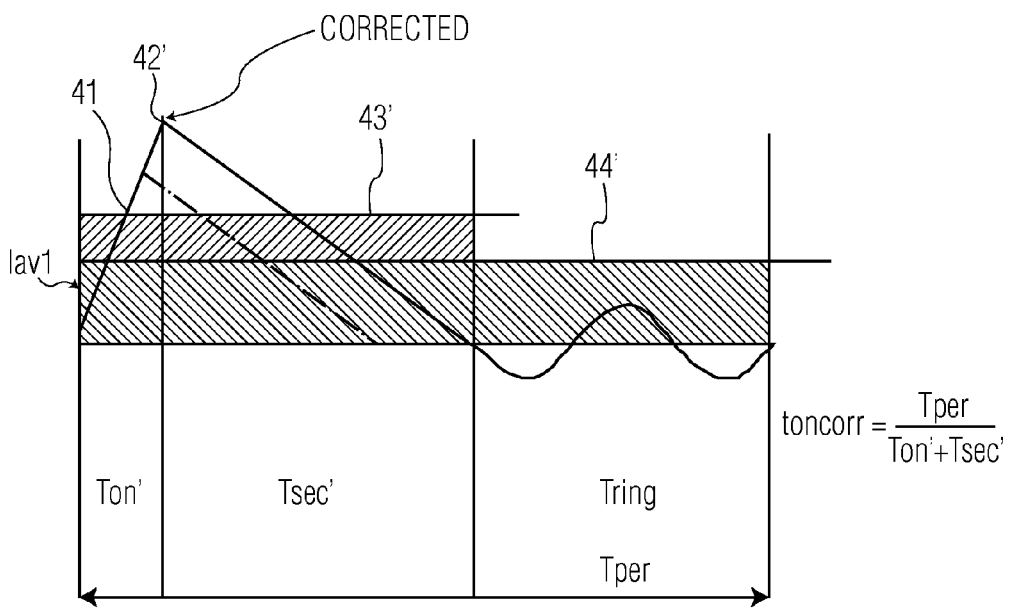
FIG. 5 shows the inductor current, for a PFC stage with an adjustment to the on-time of the switch, according to an embodiment of the invention.

In order to overcome this distortion, according to embodiments of the invention, the Ton switching period is modified as shown in FIG. 5. FIG. 5 shows, similar to FIG. 4, the current during a complete switching cycle. However, relative to the Ton interval shown in FIG. 4, the switch is kept closed for an extended period Ton', such that the maximum occurrence exceeds the level 42 to reach a peak 42'. Consequentially, the secondary stroke interval Tsec' thus increases in the same proportion. And since the ringing period Tring is unchanged, the overall switching period (Tper) increases. The average current 43' over the primary and secondary stroke (Ton'+Tsec'), is now higher than that shown in FIG. 4, since the peak current 42' is higher than the original peak current 42, but also, significantly, the average current over the complete switching period (Tper) is also higher than that the average current 44 of FIG. 4.

In order to ensure that the average current over the complete switching period is proportional to the momentary mains voltage, it can be calculated that the adjusted Ton period (Ton') is related to the Ton period absent valley skipping, by means of a correction factor Toncorr=Ton'/Ton according to the following relationship:

$$\text{Toncorr}=T\text{per}/(T\text{on}+T\text{sec}) \qquad \text{Eq. (1)}$$

Such a correction thus represents an ideal situation.

It will be apparent to the skilled person, that in the above analysis, the initial "half-period" (that is to say, from the first negative zero-crossing to the first positive zero-crossing in I), is neglected. However, the current content of this first part of the ringing is relatively small, so the error introduced is not significant, and the input distortion from the ideal sine curve is only minor. Furthermore, the damping of the ringing, for several ringings, reduces the impact of this approximation further.

Figure 6:
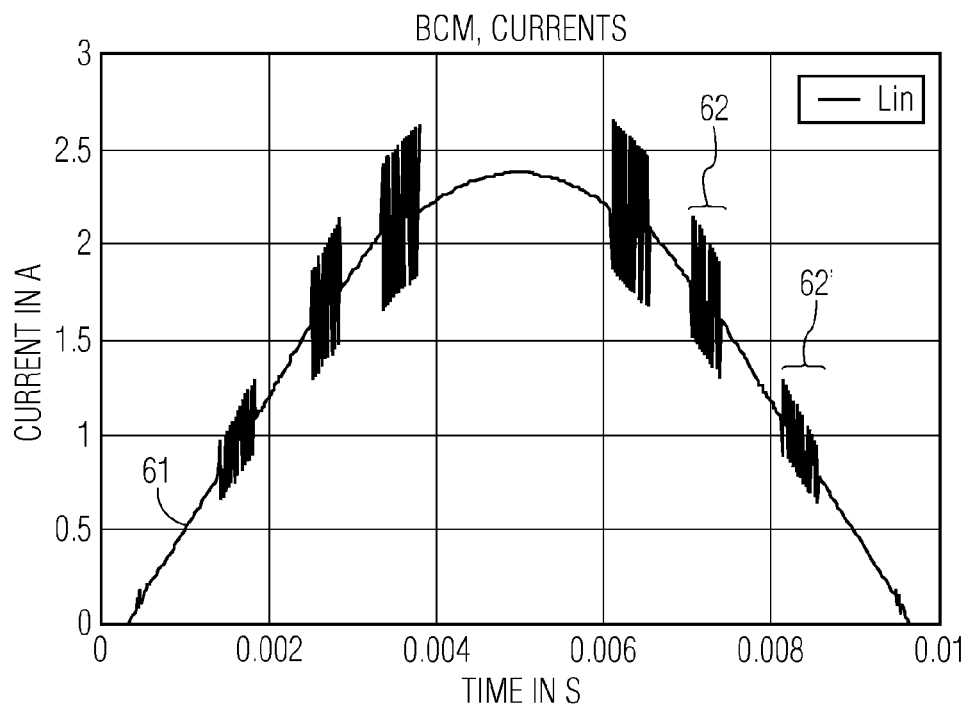
FIG. 6 shows the average inductor current over a mains half the cycle for a PFC stage operated in BCM with valley skipping according to an embodiment of the invention.

FIG. 6 shows the inductor current, averaged over the switching cycle, across a mains half-cycle, for a PFC stage of an SMPS operated by a method in accordance with an embodiment of the present invention. It will be observed from the figure that the current 61 follows a generally sinusoidal curve. The sinusoidal path of the current is interrupted during periods when the valley skipping control methodology determine that the number of valleys skipped should change, such as the time intervals 62 and 62'. During these interruptions the average currents changes rapidly having the effect of smearing out the path. However, at the end of the interruption, it will be observed that the current 61 follows the same sinusoidal path as was followed prior to the interruption. This is in direct contrast to the average current 11 observed in the prior art BCM of valley skipping control methodologies such as that shown in FIG. 1, where after a step caused by a change in the number of valleys skipped, the current follows a different generally sinusoidal path. The oscillations seen in FIG. 6 can be reduced or even avoided by introducing a small hysteresis.

Figure 2:
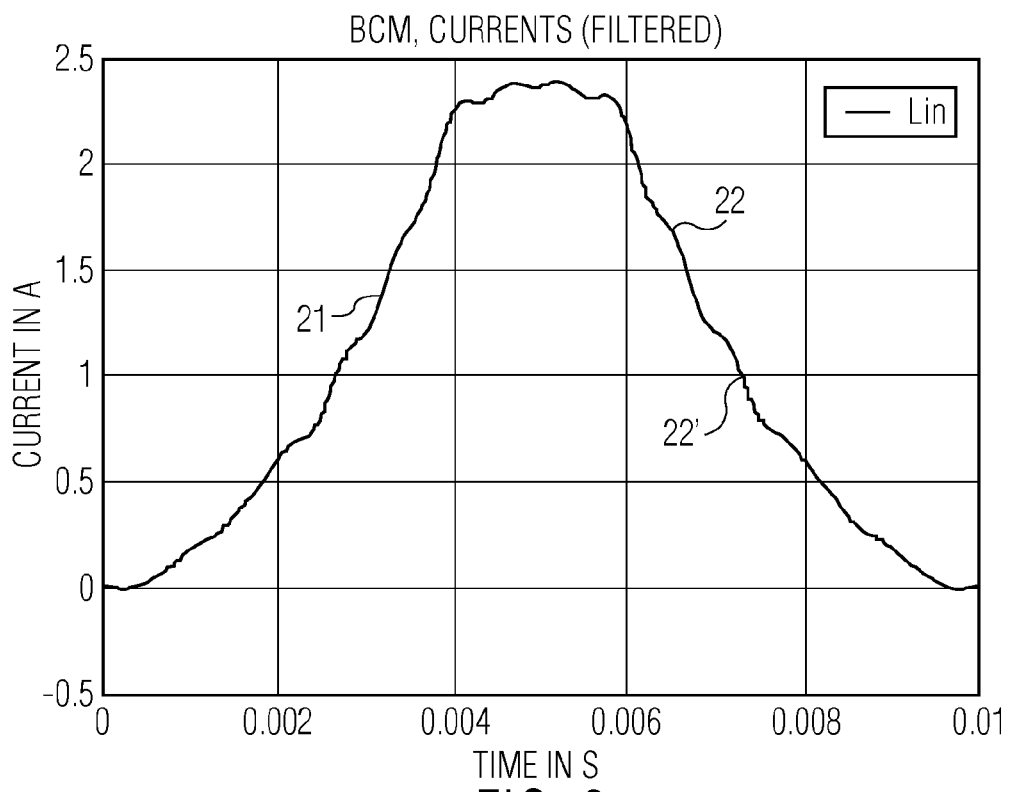
FIG. 2 shows the average current for the PFC stage corresponding to FIG. 1, upstream of an EMC/EMI filter.
Figure 3:
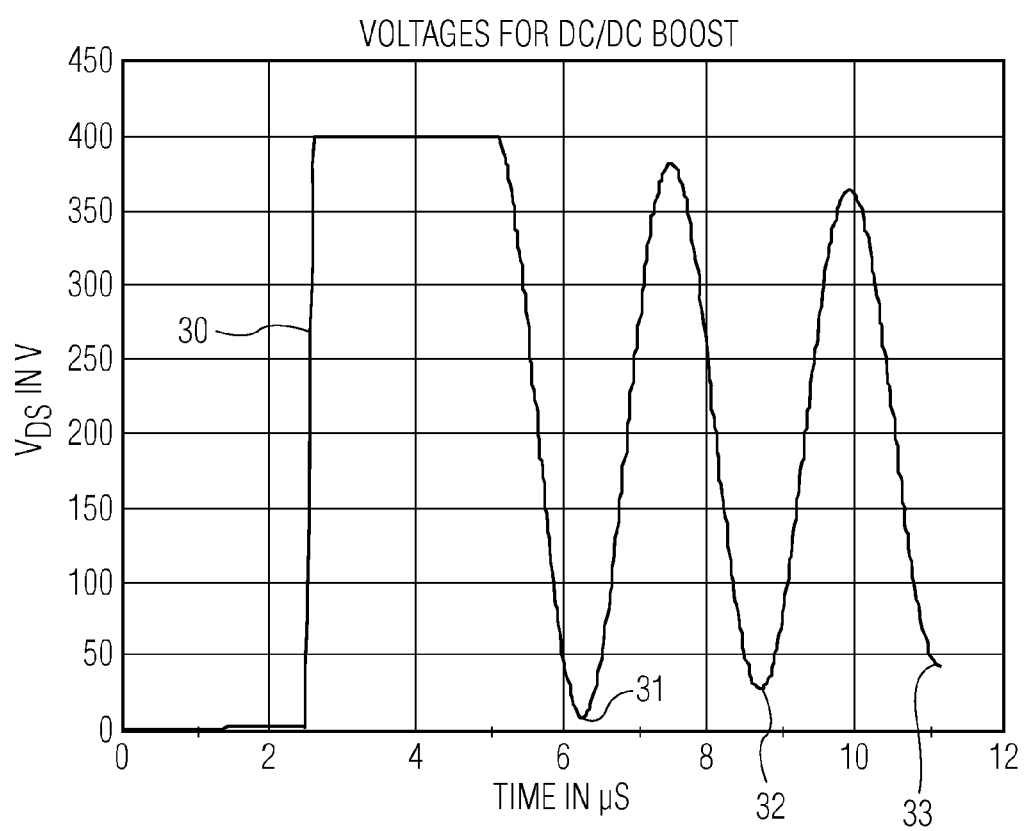
FIG. 3 shows the drain source voltage of the switch operating in BCM with valley skipping.
Figure 7:
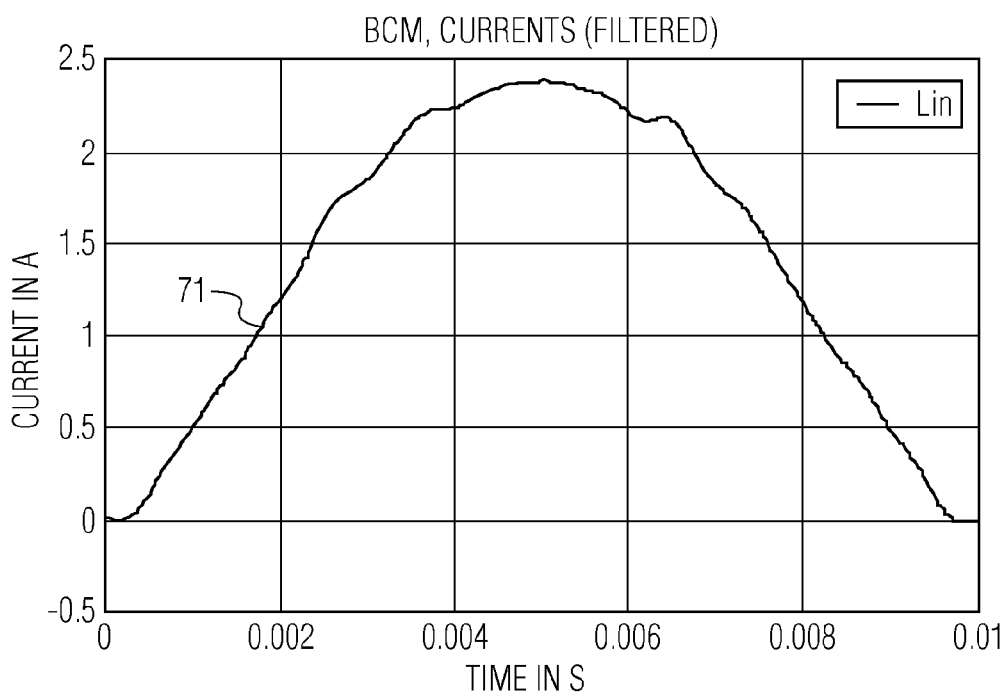
FIG. 7 shows the corresponding current to that of FIG. 6, upstream of an EMC/EMI filter.

FIG. 7 shows the inductor current 71, again averaged over a complete switching cycle, in front of the EMC filter, for a mains half-cycle. Compared with the prior art averaged current 21 in front of the EMC filter as shown in FIG. 2, the curve 71 is a much closer approximation to the ideal sine curve.

Figure 8:
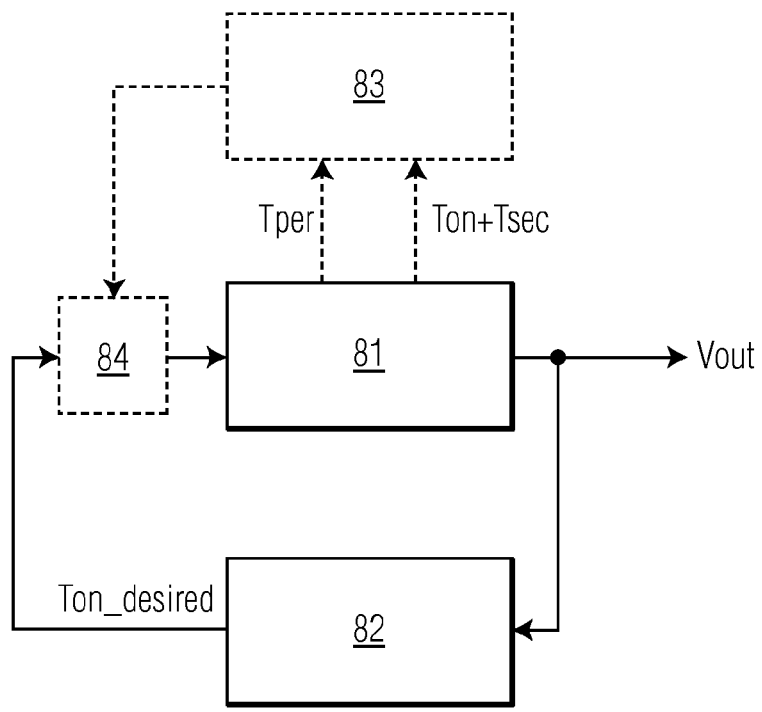
FIG. 8 shows a feedback control loop for a PFC stage, according to an embodiment of the invention.

A feedback loop for a control circuit for operating a PFC stage in accordance with embodiments of the invention is shown in FIG. 8. A PFC stage 81 provides an output voltage of Vout. A low pass filter 82 (or a combination of filter and sample-and-hold), such as is known to the skilled person and typically has a cut-off frequency of 100 Hz or lower, is provided in order to limit the rate of change of modifications to the controller of the PFC 81, in the case that a different on-time of the switch, Ton_desired, is requested. According to the embodiments, there is provided an additional element 83 of the feedback loop, which calculates the correction factor by which the on-time for the switch should be changed, Toncorr, according to equation 1. That is to say, Toncorr=Tper/(Ton+Tsec), such that the correction is equal to the ratio of the total switch period (Tper) to the sum of the primary (Ton) and secondary strokes (Tsec). The control for the PFC stage 81 is modified by the correction factor, Toncorr, by means of multiplier 84. In operation, the multiplier 84 multiplies the "fixed" Ton_desired (which is "fixed" in the sense that it is at least substantially fixed over a single mains cycle) with the actual ratio Tper/(Ton+Tsec), resulting in an iterative process over a few high-frequency (control) cycles where for each successive cycle, a new value for Toncorr is calculated, leading to a new value for Ton and as result new values for Tsec and Tper. After a few high frequency cycles a steady state equilibrium is reached.

Element 83 of the feedback loop takes as input the total switching period Tper and the sum of the primary and secondary strokes (Ton+Tsec). The sum of the primary and secondary strokes (Ton+Tsec) may be defined as the difference between the start of the switch conduction window and the end of the diode conduction window. The end of diode conduction window can be detected in various ways which will be known to the skilled person. An example is the demagnetisation sensing via the zero-crossing of the voltage over an auxiliary winding on the PFC inductor or choke. The skilled person would appreciate that such demagnetisation sensing in fact extends Tsec by a quarter period of ringing; however it is found in practice that such an offset is acceptable.

It will be appreciated, that due to the internal loops 84, 81, 83, operation of the feedback circuit described above will as mentioned above, be an iterative process that requires a few cycles to reach the final result. However, since the switching frequency is typically several orders of magnitude higher than the mains frequency, and also due to the low pass filter 82, it is the case that neither the mains voltage nor the outer regulation loop 84, 81, 82 change significantly during the few cycles required to stabilise the result.

It will be further appreciated by the skilled person, that close to zero crossings of the mains voltage, or at low output power, the primary or secondary stroke could become rather short in relation to the switching period. As a result, large values for the factor Toncorr during the iterative process could occur. This could lead to undesirably large on-times or equivalently undesirably large currents for the switch. In order to overcome this possibility, in practical implementations of the preferred embodiments, limitation to the factor Toncorr is effected, either by providing an upper bound to Toncorr, or by providing both an upper and a lower bound. (Of course, providing just a lower bound is also possible but this is a less favoured embodiment since the problem is primarily associated with too high a Toncorr, rather than too low a Toncorr).

Further, it will be obvious to the skilled person that the feedback loop shown in FIG. 8 is just one of several implementations for determination of the correct on-time Toncorr, all of which fall within the scope of the present invention. For instance, the skilled person will have no difficulty in implementing a means of determining Toncorr based on either an analogue circuit or a digital circuit. Furthermore, an implementation via a look up table is equally applicable.

It is immediately apparent from the mathematical relationship used above, that the embodiment described above relates to providing a corrected or adjusted on-time for the switch by multiplying the original on-time Ton (or a previously a corrected on-time) by a correction factor. In relation to the number of valleys skipped, the adjusted or corrected on-time thus takes approximately the form of a geometric series. It should be mentioned that, in the case of a closed-loop control, the correction factor may be modified or optimised in order to achieve a true sine-wave, such that the factor with a second valley may differ from that with the first, and so on.

However, the invention is not limited to adjustment by means of such a geometric series: other relationships may be used for the correction or adjustment. As a non-limiting example of such another relationship, an arithmetic series may be used. Where adjustment is made by means of such an arithmetic series, a predetermined time, delta_Ton, is added to the value of either Ton or Ton_desired, each time the control loop determines that a valley, or an additional valley respectively, should be skipped. Conversely, the predetermined time delta_Ton is subtracted from the value of Ton_desired each time the control loop determines that one fewer valley is skipped.

Figure 9:
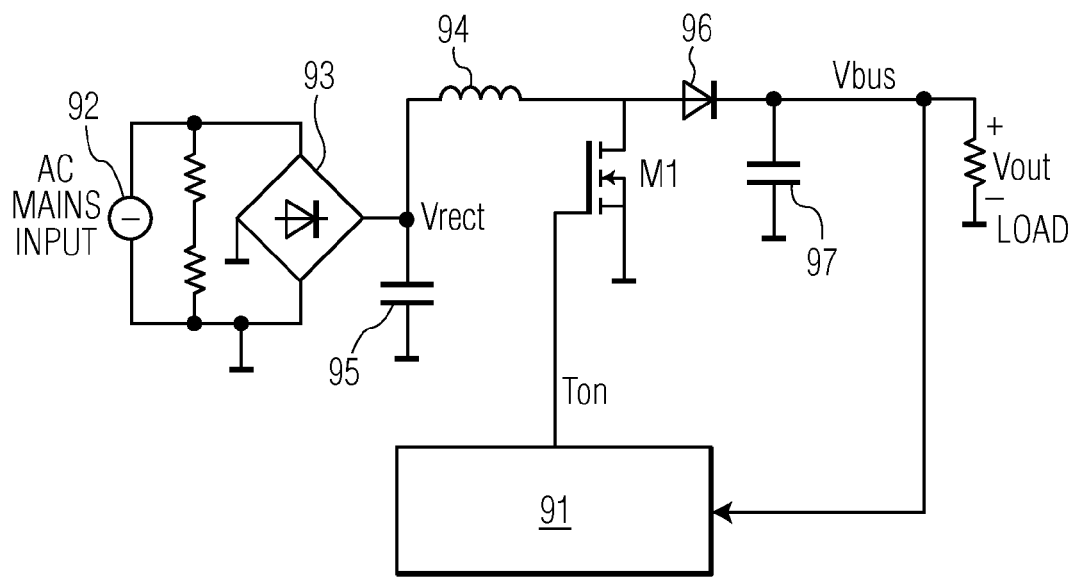
FIG. 9 shows a PFC stage of an SMPS, including a controller.

An example of the PFC stage operable in accordance with the present invention is shown in FIG. 9. The PFC stage comprises a switch M1, which is operable under a PFC controller 91. An input with input voltage Vrect is input to the PFC stage. The input may typically be provided by a mains supply 92, which is fully rectified by a full-bridge rectifier 93. The PFC stage itself comprises an inductor or choke 94, connected to the input voltage Vrect. A smoothing capacitor 95 is connected between the input and ground in order to minimise EMC effects. The end of the inductor or choke 94 distant from the input is connected to the drain of switch M1, the source of which is grounded. The operation of switch M1 is controlled by means of its gate terminal which is controlled from the PFC controller 91. The drain of switch M1 is connected to the output at voltage Vbus by means of output diode 96. A second smoothing capacitor 97 is connected between the output and ground. The PFC controller 91 takes as an input the voltage Vbus, which also provides an output voltage of Vout which may be connected across a load. Embodiments of the invention comprise a PFC controller 91 adapted for use in such a circuit and configured to operate according to one or more methods of the embodiments described above. Further embodiments may include a SMPS having a PFC stage including such a controller 91.

Figure 10A:
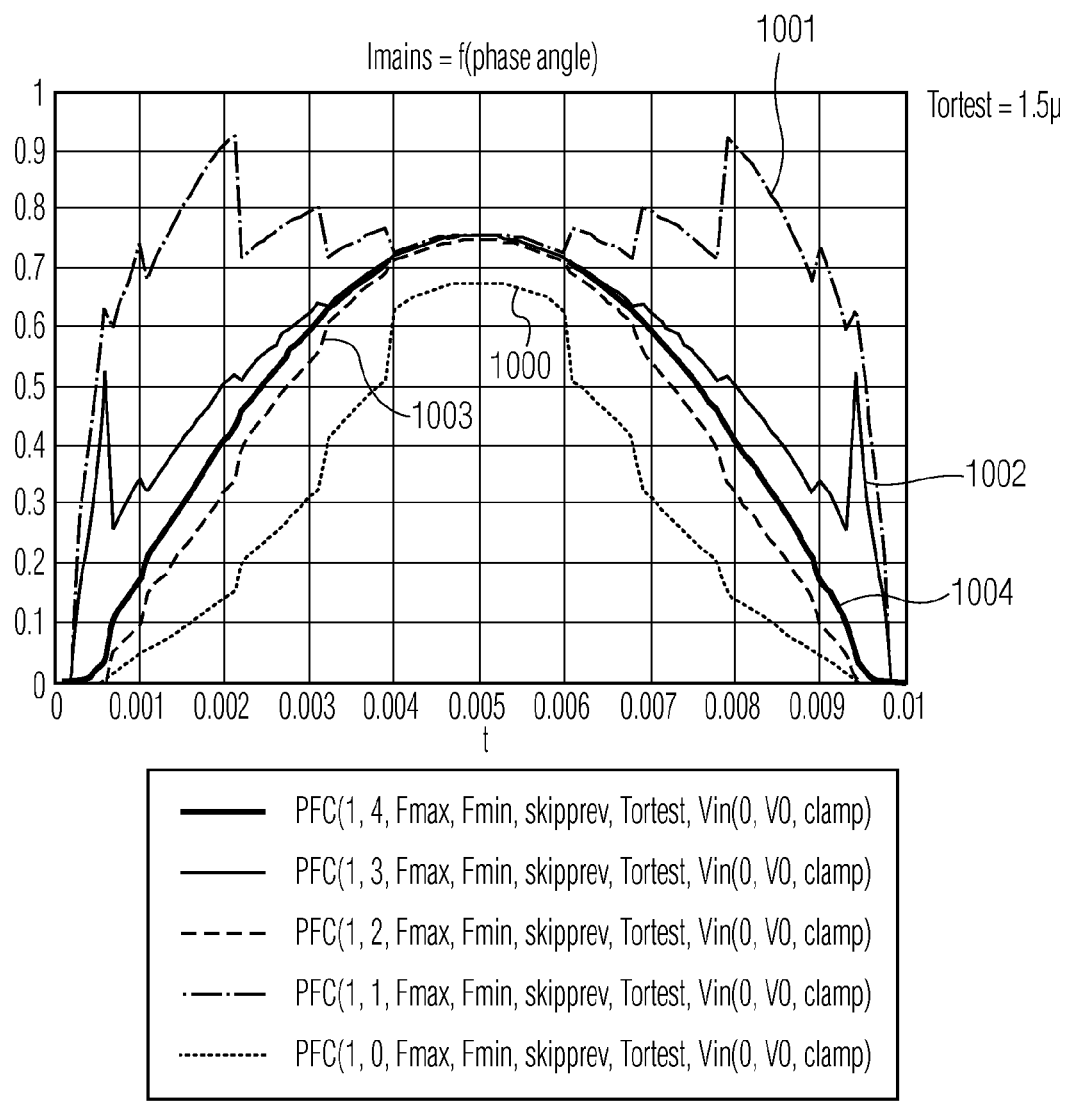
FIGS. 10(a) and (b) show a simulation, over a mains half-cycle, of the inductor current and phase, of a PFC controlled according to an embodiment of the present invention.
Figure 10B:
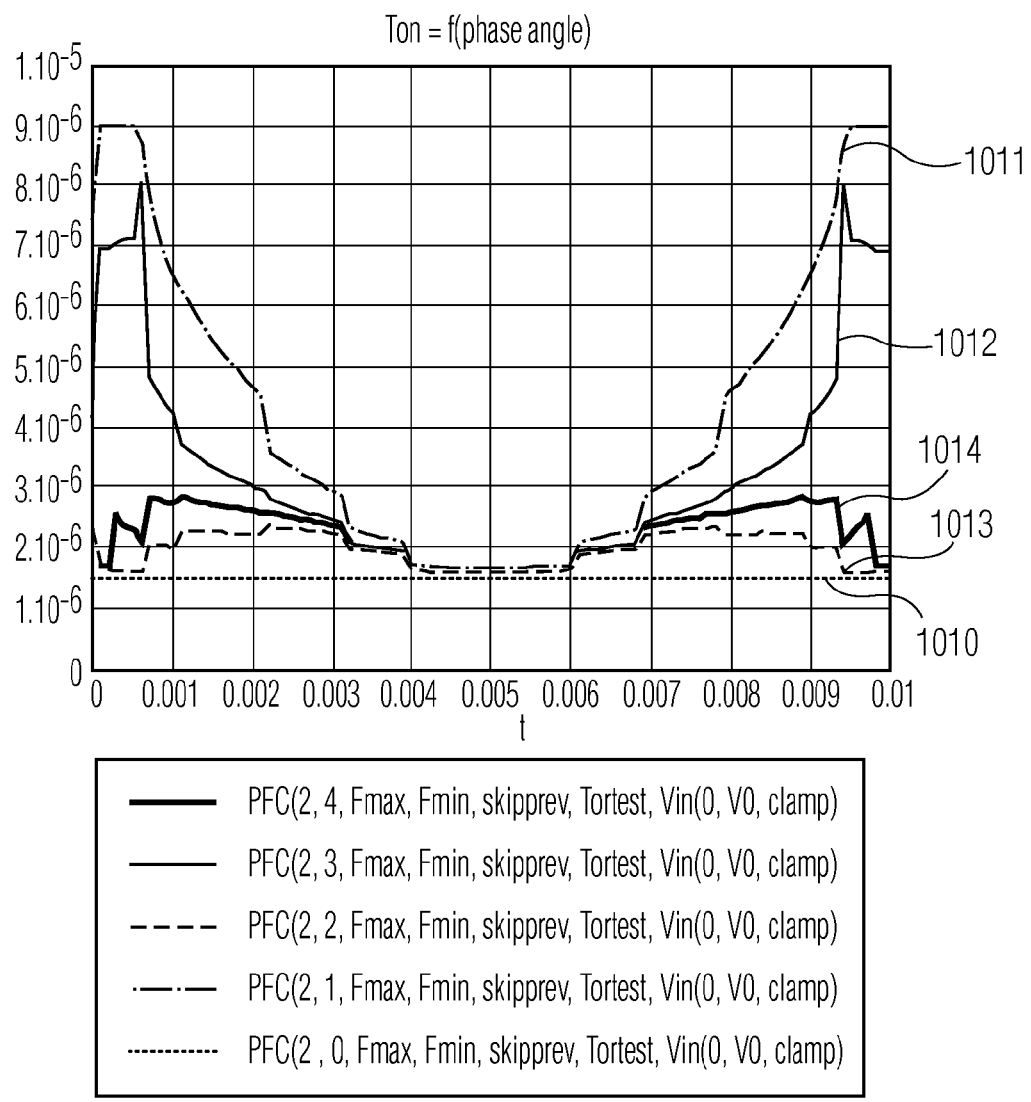

In FIG. 10 is shown a simulation of a method according to the invention. Over a mains half cycle is shown, at 1000-1004 and 1010-1014 respectively, the average inductor current over a switching cycle (at FIG. 10(a)), and the on-time of the switch (at FIG. 10(b)), both as a function of the phase angle of the mains voltage, for the $0^{th}$ to fourth switching cycle after the number of valleys skipped is increased by 1. Only the phase angle between 0 and 180 degrees is shown, corresponding with mains half-cycle. Of course, in a practical implementation, the iteration is done within a few switching cycles, so only a small part of each curve shown in the Figure is actually used. For this simulation the curves with $T_{oncorr}=1$ (that is, no correction), (1000,1010) are plotted as the starting point, as are the first (1001,1011), second (1002,1012), third (1003, 1013) and fourth (1004,1014) cycles after each starting point. It can be seen that the process takes several iterations to converge to a smooth sine wave (1004), particularly close to the zero-crossings of the mains voltage. However, it is also apparent that the average current does converge close to the ideal sine wave.

Figure 11A:
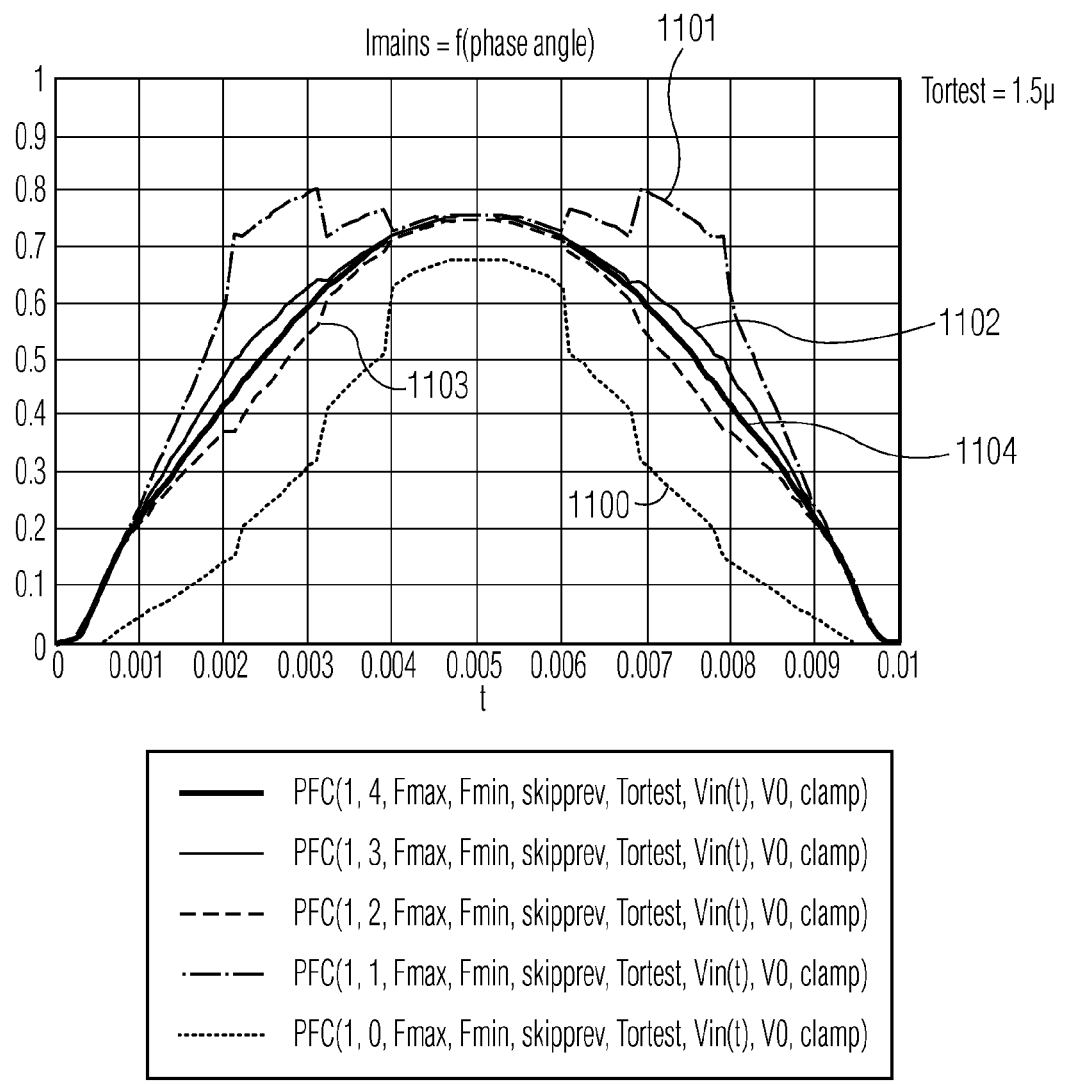
FIGS. 11(a) and (b) show a simulation, over a mains half-cycle, of the inductor current and phase, for a PFC controlled according to a further embodiment of the invention.
Figure 11B:
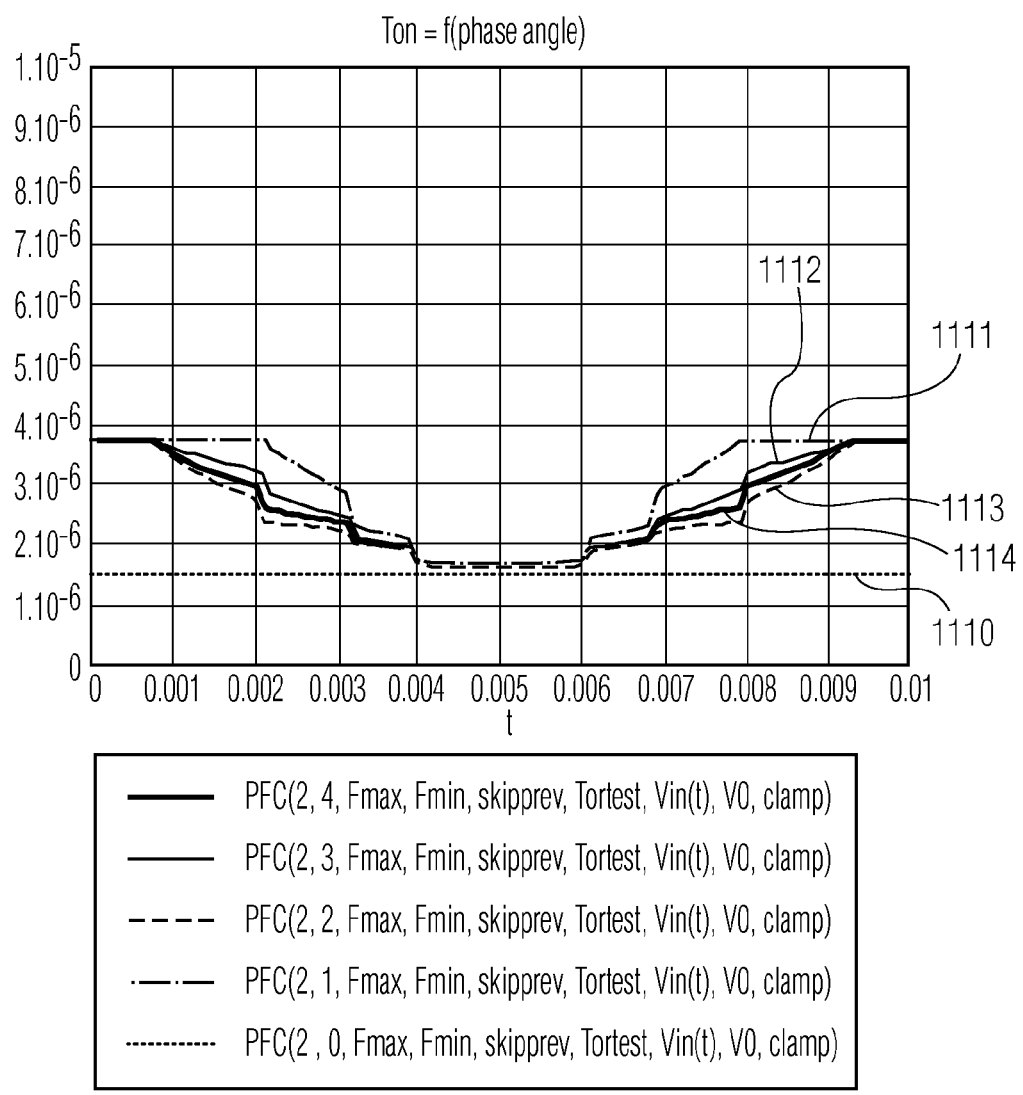

In FIG. 11 is shown a simulation similar to that of FIG. 10, except that for this simulation $T_{oncorr}$ is limited to be less than 2.5. Curves 1100-1104 and 1110-1114 depict the average currents and the on-times corresponding to 1000-1004 and 1010-1014 of FIG. 10. The figure shows that the process again converges towards an ideal sine wave; however, this time the convergence is faster, with smaller excursions. It will be appreciated that in FIG. 10 and 11 only the first 4 iterations are shown. In a practical implementation the control will continue to iterate.

The embodiments above have been described with referenced to "Ton" control. However, in other embodiments, the invention relates to PFC stages which operate according to Ipeak control. As the skilled person will be aware, in Ipeak control, in order to get a sinusoidal input current over the mains cycle, the primary peak current should be approximately proportional with the momentary mains voltage. With a fixed on-time, the primary peak current almost automatically becomes proportional to the momentary mains voltage, since di/dt=Vmains/Lboost. According to embodiments of the invention, the on-time may be varied taking into account the ratio Ton/(Tper), in order to realize a better sinusoidal input current. In known Ipeak control methods, the maximum Ipeak (in the centre of the mains half cycle) would be fixed. In order to get a nearly sinusoidal mains input current this maximum Ipeak is multiplied by the input voltage wave-shape. The maximum Ipeak is derived from the voltage control loop and proportional to the voltage control loop output signal. In an embodiment suitable for Ipeak control with valley skipping the described methods—geometric, arithmetic series, look-up table and control loop will modify the output signal of the voltage control loop. This then results in an improved, more sinusoidal, input current.

For this Ipeak control it is easily possible to add the valley skipping feature. This results in the same mains distortions as described here. Fortunately the solutions described for Ton control work as well in case of Ipeak control. The changes (geometric series, arithmetic series or control loop) have to operate on the output signal of the output voltage controller.

Furthermore, embodiments have been described with reference to a boost converter; however, the skilled person will appreciate that the invention is not so limited, and may be used with alternative forms of PFC stages such as, for instance and without limitation, with fly-back converters, buck, buck-boost, Sepic converters, Cuk converters and Zeta converters, etc.

In summary, then, for many applications an SMPS is designed to operate in boundary conduction mode. As the load decreases the switching frequency increases, and so the concept of valley skipping may be used in which the switching frequency is clamped, by delaying to turn on the time of the active switch, for an integral number of cycles of a resonant circuit in the SMPS. With further reduction of the load, additional valleys may be skipped. However, each change in the number of valleys skipped results in a step in the input current that is drawn, distorting the ideal mains sine wave, thereby increasing unwanted harmonics. A control method is disclosed, which reduces the steps: instead of a constant on-time for the switch, the duration of the on-time is increased each time an additional valley to be skipped. The predetermined increase may be either a fixed fractional increase or a further additional increment; it may be determined by a small regulation loop that multiplies the on-time from the main loop with a factor equal to the ratio between measured period time and the sum of primary and secondary stroke times.

From reading the present disclosure, other variations and modifications will be apparent to the skilled person. Such variations and modifications may involve equivalent and other features which are already known in the art of power factor correction, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of controlling a power factor correction stage for a switched mode power supply, the power factor correction stage having a switch which is periodically closed for an on-time Ton, and operating in boundary conduction mode with valley skipping the method including the steps of,
   determining a change in the number of valleys skipped in a switching cycle, and
   controlling the duration of the on-time of a subsequent switching cycle in dependence on the change in the number of valleys skipped; and
   wherein the power factor correction stage operates with a switching cycle having a duration Tper and a secondary stroke, which secondary stroke commences at the end of the on-time Ton and ends when an output current first reaches zero thereafter and has a duration Tsec,
and wherein
   a duration of the on-time of the subsequent switching cycle, Ton', is calculated from the duration of the on time (Ton) through:

$$Ton' = Ton * Tper/(Ton+Tsec).$$

2. The method of claim 1, wherein the duration of the on-time is controlled so as to vary with the number of valley skipped as an arithmetic series.

3. The method of claim 2, wherein the arithmetic series is chosen to maximise a power factor of the power factor correction stage.

4. The method of claim 1, wherein the duration of the on-time is controlled so as to vary with the number of valleys skipped as a geometric series.

5. The method of claim 4, wherein the geometric series is chosen to maximise a power factor of the power factor correction stage.

6. The method of claim 1, including a low-pass filter step for preventing a change in duration of the on-time between consecutive switching cycles from exceeding a predetermined limit.

7. A controller for a switched mode power supply, the controller being configured to operate according to the method as claimed in claim 1.

8. A switched mode power supply comprising a controller as claimed in claim 7.

* * * * *